(12) United States Patent
Liu (10) Patent No.: US 9,897,391 B2
(45) Date of Patent: Feb. 20, 2018

(54) PHASE TRANSFORMATION HEAT EXCHANGE DEVICE

(71) Applicant: BEIJING TERASOLAR ENERGY TECHNOLOGIES CO., LTD., Beijing (CN)

(72) Inventor: Yang Liu, Beijing (CN)

(73) Assignee: BEIJING TERASOLAR ENERGY TECHNOLOGIES CO., LTD., Beijing (CN)

( * ) Notice: Subject to any disclaimer, the term of this patent is extended or adjusted under 35 U.S.C. 154(b) by 278 days.

(21) Appl. No.: 14/222,554

(22) Filed: Mar. 21, 2014

(65) Prior Publication Data

US 2014/0202667 A1    Jul. 24, 2014

Related U.S. Application Data

(63) Continuation of application No. PCT/CN2012/076424, filed on Jun. 4, 2012.

(30) Foreign Application Priority Data

Sep. 23, 2011   (CN) .......................... 2011 1 0285859

(51) Int. Cl.
*F28D 15/04* (2006.01)
*F24J 2/07* (2006.01)
(Continued)

(52) U.S. Cl.
CPC ............ *F28D 15/04* (2013.01); *F24J 2/0483* (2013.01); *F24J 2/07* (2013.01); *C09K 5/04* (2013.01);
(Continued)

(58) Field of Classification Search
CPC .. F28D 15/043; F28D 15/0266; F28D 15/046; F28D 15/04; F28D 15/06; F24J 2/32
(Continued)

(56) References Cited

U.S. PATENT DOCUMENTS 4,748,826 A * 6/1988 Laumen .................... F25B 1/06
                                                    417/174
4,825,661 A * 5/1989 Holtzapple ............. F25B 39/02
                                                   165/104.26
(Continued)

FOREIGN PATENT DOCUMENTS

CN        200947001 Y        9/2007
CN        101576356 A       11/2009
(Continued)

OTHER PUBLICATIONS

Kreeb, DE3526574TRANS (English Translation), Mar. 1987.*
(Continued)

*Primary Examiner* — Len Tran
*Assistant Examiner* — Eric Ruppert
(74) *Attorney, Agent, or Firm* — J.C. Patents (57) ABSTRACT

The invention provides a phase transformation heat exchange device. The device includes an inner tube, an outer tube, and a heat exchange medium; the space between the inner tube and the outer tube forms a whole or a part of a liquid phase region; a whole or a part of space inside the inner tube forms a vaporization region; the heat exchange medium with a relatively high pressure inside the liquid phase region enters the vaporization region with a relatively low pressure while being heated in vortex flow, and flows out of the device after being vapored, so as to complete heat exchange. The device can be applied to DSG systems of the solar energy photothermal field, and can also be applied to an input-output system of a heat storage system, or the field of boiler heating. It is achieved with safe operation, low cost, and good application range.

7 Claims, 5 Drawing Sheets

(51) Int. Cl.
*F24J 2/04* (2006.01)
*F28D 15/06* (2006.01)
*F28D 15/02* (2006.01)
*F24J 2/18* (2006.01)
*F24J 2/10* (2006.01)
*F24J 2/32* (2006.01)
*C09K 5/04* (2006.01)

(52) U.S. Cl.
CPC .. *F24J 2/18* (2013.01); *F24J 2/32* (2013.01); *F24J 2002/108* (2013.01); *F28D 15/0266* (2013.01); *F28D 15/043* (2013.01); *F28D 15/046* (2013.01); *F28D 15/06* (2013.01); *F28F 2260/00* (2013.01); *Y02E 10/41* (2013.01); *Y02E 10/44* (2013.01)

(58) Field of Classification Search
USPC ........................................ 165/104.21, 104.26
See application file for complete search history.

(56) References Cited

U.S. PATENT DOCUMENTS

| | | | | |
|---|---|---|---|---|
| 5,816,313 | A | * | 10/1998 | Baker ................... F16K 15/048 137/519.5 |
| 6,397,936 | B1 | | 6/2002 | Crowley et al. ......... 165/104.26 |
| 2007/0056715 | A1 | * | 3/2007 | Mucciardi ........... F28D 15/0266 165/104.26 |
| 2008/0137299 | A1 | | 6/2008 | Zhang et al. ................ 361/699 |
| 2009/0071634 | A1 | | 3/2009 | Turner et al. ............ 165/104.26 |
| 2009/0321055 | A1 | * | 12/2009 | Wang ..................... F28D 15/043 165/104.26 |
| 2011/0120451 | A1 | * | 5/2011 | Miles ......................... F24J 2/28 126/635 |
| 2011/0120452 | A1 | * | 5/2011 | Miles .................... F24J 2/1047 126/694 |

FOREIGN PATENT DOCUMENTS

| | | | | |
|---|---|---|---|---|
| CN | 101706223 | A | | 5/2010 |
| CN | 201561413 | U | | 8/2010 |
| CN | 202018022 | U | | 10/2011 |
| CN | 202350604 | U | | 7/2012 |
| CN | 103017585 | B | | 1/2015 |
| DE | 3526574 | | * 3/1987 | ............. F25B 39/02 |
| DE | 102007015080 | A1 | | 10/2008 |
| GB | 1 233 923 | A1 | | 6/1971 |
| JP | 62-284193 | A | | 12/1987 |
| JP | 09-14876 | A | | 1/1997 |
| JP | 11-37682 | A | | 2/1999 |
| JP | 2001-132988 | A | | 5/2001 |
| JP | 2008-261584 | A | | 10/2008 |
| KR | 2009026232 | | * 3/2009 | |
| KR | 1020090102944 | A | | 10/2009 |
| RU | 2098733 | | * 12/1997 | ........... F28D 15/043 |
| SU | 485296 | | * 1/1976 | |

OTHER PUBLICATIONS

Majdanik, RU2098733TRANS (English Translation), Dec. 1997.*
Gerasimov, SU485296TRANS (English Translation), Jan. 1976.*
Sonbongwun, KR2009026232TRANS (English Translation), Mar. 2009.*
The extended European Search Report of corresponding European patent application No. 12833719.33 and corresponding international PCT application No. PCT/CN2012/076424, dated Jul. 30, 2015.
International Search Report of corresponding International Application No. PCT/CN2012/076424, dated Sep. 13, 2012.
Chinese First Examination Report of corresponding Chinese Application No. 201110285859.8, dated Feb. 8, 2014.

* cited by examiner

PHASE TRANSFORMATION HEAT EXCHANGE DEVICE

CROSS-REFERENCE TO RELATED APPLICATIONS

This application is a continuation of International Patent Application No. PCT/CN2012/076424, filed on Jun. 4, 2012, which claims priority to Chinese Patent Application No. 201110285859.8, filed on Sep. 23, 2011, both of which are hereby incorporated by reference in their entireties.

TECHNICAL FIELD

The present invention relates to a heat exchange device applicable to various fields, more particularly to a phase transformation heat exchange device in the field of solar energy utilization.

BACKGROUND

With the use of solar energy and other renewable energy flourishing around the world, concentrated solar power (CSP) has gradually been recognized. In a CSP system, heat absorption and heat transfer have a very important role. In solar heat collection technologies, currently heat transfer oil is mainly used as a heat transfer working medium, after heat exchange through the heat transfer oil, a conventional steam turbine is driven to make a generator set generate power. Since the operating temperature of the heat transfer oil has to be controlled below 400° C., beyond this temperature it will cause heat transfer oil cracking, increase in viscosity and heat transfer efficiency reduction and other issues, thus limiting the operating temperature of the concentrated solar power. Meanwhile, the usage cost of heat transfer oil is high, therefore, there is an urgent need for new heat transfer working medium to replace heat transfer oil, so as to raise the operating temperature and reduce the equipment cost and operating cost. Currently, alternatives of heat transfer medium of international solar heat collection technologies include molten salt materials, but their crystallization point is relatively high, most are about from 230° C. to 260° C., so there are still many difficulties in direct replacement. Currently molten salt is mainly used for heat energy storage.

Direct steam generation (DSG) technology directly using water as a heat exchange medium has been tested for many years, and the principle of the technology is similar to the operation principle of a steam boiler heat pipe, which uses water as working medium to inject low temperature water from an end of heat absorption pipeline. The temperature of the water gradually warms up during the process of moving along the axial direction of the pipeline, and the water becomes saturated vapor when reaching the boiling point, and then continues to absorb heat and becomes superheated vapor. Because instability occurs when the water boils in the heating tube, there are problems of two-phase stream transmission, uneven of vapor pressure in the heat collection tube, etc., and damage phenomena of water hammer, vibration, piping material fatigue occur; also during the period when saturated vapor becomes superheated vapor, due to the poor heat conductivity of vapor, heat absorption capacity is relatively weak and damage caused by pipe over-heat is prone to occur; and when the pipeline is unevenly heated, the temperature difference of the pipe walls is relatively large, therefore serious bending will occur, which brings other losses (such as a vacuum seal damage); in addition, the existing technology still cannot solve a series of problems caused by that a portion of the DSG pipe is not heated (for example, the mirror field has shadow locally due to cloud coverage), for example, the flow control of water input and vapor output, and impacts of parameter change. Therefore, the technology is still at the experimental stage. But as long as these problems can be solved, the DSG technology will become the key technology of environmentally safe solar thermal power generation with the lowest cost and highest efficiency.

SUMMARY

The object of the present invention is to overcome the above problems existing in the prior art and provide a phase transformation heat exchange device which can be applied to various fields.

According to embodiments of the present invention, a phase transformation heat exchange device is provided, which includes an inner tube, an outer tube and a heat exchange medium; where the space between the inner tube and the outer tube forms a whole or a part of a liquid phase region; a whole or a part of space inside the inner tube forms a vaporization region; the heat exchange medium with a relatively high pressure inside the liquid phase region enters the vaporization region with a relatively low pressure while being heated when flowing, and flows out of the phase transformation heat exchange device after being vapored.

Further, a spiral flow guiding device is disposed inside the liquid phase region, such as a spiral rotating fin or a spiral tube coil, so that a liquid phase heat exchange medium carries out a circular vortex flow inside the liquid phase region, and good even temperature performance of a contact surface with the heat exchange medium is obtained.

Further, in an embodiment, the liquid phase region includes an inner space of a third tube disposed inside the inner tube, which provides a circular flow path of the liquid phase region, homogenizes the temperature, lowers the warping of walls of the liquid phase region and the vaporization region, meanwhile increases the heat exchange area between the liquid phase region and the vaporization region, and improves the heat exchange effect of the vaporization region.

Further, a liquid phase heat exchange medium carries out a circular vortex flow inside the liquid phase region, thus better optimizing the radial even temperature performance of the contact surface of the liquid phase region and the vaporization region.

Further, a contact wall between the liquid phase region and the vaporization region is provided with one or more medium passages, for example, each of the medium passages is a capillary through-hole, a capillary, a nozzle or a permeable material port, in addition, the medium passages are disposed spaced on an inner surface of the contact wall along an axial direction.

Further, the medium passages are disposed spaced on an inner surface of the contact wall along an axial direction. Under the function of a circulation pump and a third tube, the liquid phase heat exchange medium circulates wholly inside the liquid phase region, homogenizes the temperature, further lowers the warping of the structure, and meanwhile completes the heat exchange medium supplement to the vaporization region.

Further, the medium passages are disposed spaced on a wall of the third tube along an axial direction; after the liquid phase heat exchange medium spirally flows along the liquid phase region between the outer tube and the inner tube, it enters the inside of the third tube, where the flow of the liquid phase heat exchange medium in the pipe greatly lowers the circumferential temperature difference of the outer wall and reduces the warping of the structure; meanwhile it completes the energy supplement to the vaporization region.

Further, a spiral flow guiding device is disposed inside the liquid phase region. During the process of flowing through the liquid phase region, under the function of the spiral flow guiding device, the liquid phase heat exchange medium moves spirally, which lowers the temperature difference of the circumferential wall of the liquid phase region, and lowers the warping of the pipeline.

Further, the liquid phase heat exchange medium circularly flows inside the liquid phase region, thereby more efficiently lowering the temperature difference of the circumferential wall of the liquid phase region, and lowering warping of the materials of the liquid phase region and the vaporization region to the most degree.

Further, the inner tube and/or the third tube are a spiral corrugated tube or a spiral corrugated segmented tube, which makes the liquid phase heat exchange medium of the liquid phase region and the vapor phase heat exchange medium of the vaporization region spirally move, enter the turbulent status, thereby increasing heat exchange between the heat exchange medium and the wall, so that the wall has a good even temperature performance in the circumference direction.

Further, the phase transformation heat exchange device further includes an superheat region, which receives and superheats the heat exchange medium in vapor phase or vapor-liquid mixed phase flowing out from the vaporization region, so as to obtain a better vapor parameter.

Preferably, a spiral flow guiding device is disposed in at least one of the liquid phase region, the vaporization region and the superheat region. During the process of flowing, under the function of the spiral flow guiding device, the heat exchange medium moves spirally, which lowers the temperature difference of the circumferential wall, and lowers the warping of the pipeline.

Further, the spiral flow guiding device is a spiral rotating fin, and the perpendicular surface of the spiral rotating fin is provided with a plurality of blocking slices, which increases the consistency of self disturbance and temperature of the liquid phase heat exchange medium, lowers the thermal resistance between the outer metal tube and the inner metal tube, and provides enough temperature difference needed for the vaporization process of the liquid phase heat exchange medium.

Further, the superheat region is an inner space of a fourth tube, and the fourth tube is disposed by extending upward along an axis length direction of the outer tube or parallel to the outer tube, which receives thermal energy in the axial direction, and changes the vapor phase heat exchange medium into superheated vapor of high parameters.

Further, the superheat region is an inner space of an independent fourth tube disposed parallel to the outer tube. The mode is more convenient to take advantage of a linear light-concentrating system, through a reasonable optical design, it can realize receipt of light-concentrating energy of the fourth tube and the outer tube to a certain proportion. The fourth tube receives a small amount of thermal energy, and changes the saturated vapor or wet vapor into superheated vapor, and transfers to the outside of the system.

Further, the liquid phase region is provided with a check valve at an inlet of the liquid phase heat exchange medium, and controls continuous supplement of water amount and pressure of the liquid phase region.

Further, the outer tube is disposed in sections, in addition, a check valve is disposed at an inlet of liquid phase heat exchange medium of each independent outer tube separately, and independent pressure control and heat exchange medium input control are implemented separately, which avoids the case that a part along the axial direction of the outer tube is heated unevenly but obtains the same water amount, and realizes high temperature multiple injection and low temperature less injection.

Further, the heat exchange medium is injected from the liquid phase region into the vaporization region by using a pulse-type compression liquid ejection method. The pulse liquid is injected into the liquid phase region, which more efficiently supplements the flow of liquid phase heat exchange medium to the liquid phase region.

Further, the liquid phase region includes an exhaust region, where the exhaust region mainly collects vapor generated as the liquid phase region being heated fiercely inside the liquid phase heat exchange device, and exhausts to the outside of the system through the exhaust valve disposed at the top position of the liquid phase region.

Further, the liquid phase region is disposed at an inclination angle, and an exhaust region is disposed in the liquid phase region.

Further, the liquid phase region is disposed with its diameter gradually changing along a flowing direction of the liquid phase heat exchange medium, where its top position is an exhaust region.

Further, an exhaust valve is disposed at an upper position of the exhaust region, and the exhaust outlet is connected to the superheat region and/or the vaporization region.

Preferably, the heat exchange medium is water, heat transfer oil or DOWTHERM of the Dow Chemical Company.

The phase transformation heat exchange device according to embodiments of the present invention can be applied to the solar energy heat utilization fields such as trench photothermal, Fresnel array photothermal, or tower-type photothermal collector, etc.; it is also applied to the fields of boiler heating, and heat input and output application of a heat storage system.

The phase transformation heat exchange device of the embodiments according to the present invention can simultaneously inject a heat exchange medium to the vaporization region of the inner tube from a plurality of position points along the pipe axial direction, so that the quantity of the injected heat exchange medium at each position is relatively small, and it can obtain basically similar phase transformation of temperature rise along most of the axial length of the phase transformation heat exchange device; because of the spiral circulation of the liquid phase heat exchange medium in the system, temperature unevenness on the circumferential surface due to uneven heating of the pipe is reduced, so as to avoid pipe warp; in addition, it overcomes the following defects in the prior art: conventionally the heat exchange medium is directly injected at one end of the heating tube, and the heat exchange medium is gradually heated and its temperature gradually increases while moving along the axial direction inside the heating tube, which causes: the plugging flowing state in the saturated flow boiling region, the unstable heating state due to laminated flow, uneven heat absorption capability of the heating tube along the axial direction, and uneven temperature on the circumference of the heating tube section after vaporization, etc.; in addition, it overcomes problems such as water hammer, oscillation phenomenon, pipe fatigue damage, burnout due to superheating of part of the pipe, and pipe bending, etc., which are brought about by the resulting two-phase stream transmission in the axial direction and axial uneven distribution of vapor pressure. In addition, because the temperature of the outer tube are relatively even at most positions along the axial length direction of the absorption pipe, and the difference is not large, the whole heat absorption efficiency of the device according to embodiments of the invention is better than the conventional single end input mode.

BRIEF DESCRIPTION OF DRAWINGS

FIG. 4-1 is a schematic diagram of a whole structure of a phase transformation heat exchange device applied to the solar energy Fresnel array field according to a third embodiment of the present invention;

FIG. 4-2 is a schematic structural diagram of a phase transformation heat exchange device according to the third embodiment;

FIG. 4-3 is a schematic diagram of the phase transformation heat exchange device being heated according to the third embodiment;

FIG. 4-4 is a schematic structural diagram of a fourth tube of the phase transformation heat exchange device according to the third embodiment;

DESCRIPTION OF EMBODIMENTS

Embodiments of the present invention will be described in detail with reference to the accompanying drawings.

Figure 1:
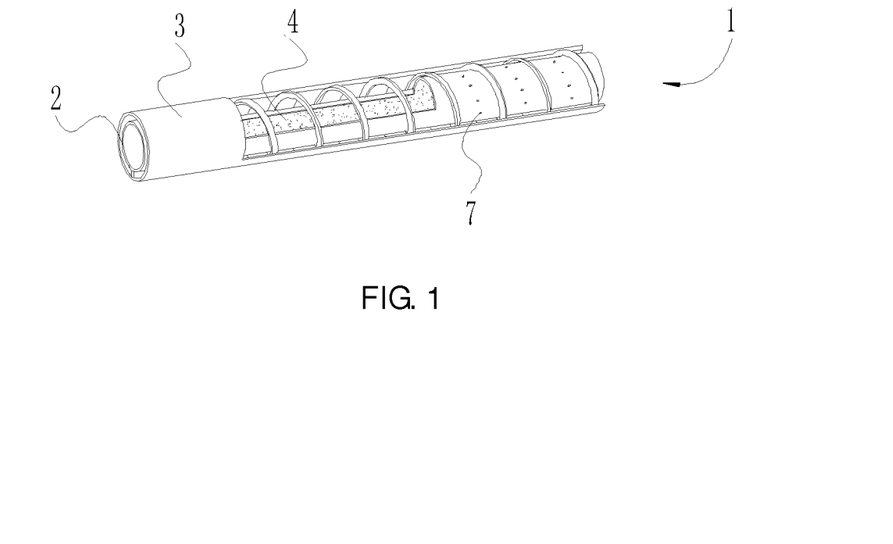
FIG. 1 is a schematic structural diagram of a phase transformation heat exchange device according to a first embodiment of the present invention.

FIG. 1 is a schematic structural diagram of a phase transformation heat exchange device according to a first embodiment of the present invention. It can be seen from partial sectional view of FIG. 1 that, a phase transformation heat exchange device 1 includes an inner metal tube 2, an outer metal tube 3 and a heat exchange medium 4. The inner metal tube 2 and the outer metal tube 3 are disposed inside and outside the same axis. The annular space formed between the inner metal tube 2 and the outer metal tube 3 is a liquid phase region, and the inner space of the inner metal tube 2 is a vaporization region.

Run-through medium passages are disposed on the wall of the inner metal tube 2 along the axial length direction of the inner metal tube 2, where each of the medium passages is a capillary through-hole 7, a capillary, a nozzle or a permeable material port.

The exterior wall of the outer metal tube 3 is a heating surface; the liquid phase heat exchange medium is heated inside the liquid phase region. In addition, because of liquid convection and forced circulation, the circumferential temperature is basically an even temperature, which can avoid serious warping due to large wall temperature difference caused by the exterior of the outer metal tube 3 being heated unevenly. The temperature of the liquid phase region is higher than the temperature of the saturated vapor corresponding to the pressure of the vaporization region formed by the inner metal tube 2, so as to continue providing heat needed for vaporization of the heat exchange medium inside the vaporization region and complete the phase transformation heat exchange process of the heat exchange medium.

The specific heat exchange process is as follows:

The heat exchange medium 4 is provided with a check valve at the inlet of the outer metal tube 3, controls to continue supplementing the heat exchange medium 4, and keeps the internal pressure of the liquid phase region; the heat exchange medium 4 flows through the liquid phase region in a liquid phase form, receives heat transmitted from the exterior wall of the outer metal tube 3; after the liquid phase heat exchange medium 4 being heated, the temperature and the pressure thereof increase; when the difference between the pressure formed by the liquid phase heat exchange medium 4 and the pressure formed by the heat exchange medium 4 inside the vaporization region is greater than a certain value, the liquid phase heat exchange medium 4 passes through the wall capillary through-holes 7 of the inner metal tube 2 from the liquid phase region (high pressure) to the vaporization region (low pressure); because there are certain pressure drops when ejected from the capillary through-holes 7, for example, 1-2 MPa, the saturation temperature difference between the two is approximately 20~25. After reaching the inner metal tube 2, part of the liquid phase heat exchange medium with high pressure flashes, and another part receives the heat transmitted to the inner wall of the inner metal tube 2 through the liquid phase region (meanwhile the inner wall temperature of the inner metal tube 2 maintains a temperature at least greater than the saturation temperature 20 corresponding to the inner pressure of the inner metal tube 2). The liquid phase heat exchange medium 4 can conveniently obtain energy, be transformed into the vapor phase heat exchange medium 4, and output to the outer system; because each of the capillary through-holes 7 is relatively small, driven by the pressure difference or the temperature, the flow coming out from the hole is very small; basically even boiling heat exchange occurs inside the inner metal tube 2, thus avoiding a huge amount of liquid phase depositing at the bottom or generating unstable states such as local abrupt boiling, etc.

When continuous receipt of external heat by the exterior wall of the outer metal tube 3 increases, the heat transferred to the inner wall of the outer metal tube 3 and the liquid phase heat exchange medium inside the liquid phase region by the exterior wall increases, thus, the pressure and temperature of the liquid phase heat exchange medium increase. According to the orifice flow theory, the orifice flow directly relates to the inlet and outlet pressure of the orifice, and has an inverse relationship with the liquid phase viscosity. The temperature increases, the liquid viscosity decreases, and the orifice flow will increase, that is, when the heat received by the phase heat exchange medium 4 increases, and the pressure or temperature increases, the orifice flow will increase, so as to release the pressure and temperature, thereby reaching relative stabilization between the internal pressure and the temperature.

When continuous receipt of external heat by the exterior wall of the outer metal tube 3 is insufficient, the orifice flow reduces due to the internal temperature and pressure of the liquid phase heat exchange medium of the liquid phase region, the flow ejected into the vaporization region automatically decreases, which achieves the purpose of controlling the flow of the liquid phase heat exchange medium and the vapor phase heat exchange medium automatically according to the heat flow received by the system.

The phase transformation heat exchange device can automatically control the internal flow according to the external heating condition, continue guaranteeing relative stability of the inner wall temperature of the inner metal tube 2, and provide a good heat exchange environment of heat exchange medium; what is more important is that, because the liquid phase heat exchange medium inside the annular liquid phase region formed by the outer metal tube 3 and the inner metal tube 2 can better guarantee the stability of its own temperature, therefore, even the wall of the outer metal tube 3 in contact with the liquid phase heat exchange medium is heated unevenly in the circumferential direction, the wall temperature is basically even under the impact of the liquid phase water; in addition, the uneven annular wall temperature problem caused by the water vaporization phase transformation process inside the inner metal tube 2 is solved, if the liquid phase heat exchange medium 4 is water, it is able to better solve the problems such as the serious pipe warping and the system stability damage due to the uneven annular wall temperature in the conventional DSG system, etc.

The heat exchange medium 4 of the phase transformation heat exchange device is a substance having vapor phase and liquid phase transformation within a proper application scope, such as heat pipe medium of water, ketone, ether, alcohol, various organics, and metal of liquid phase or low boiling point, etc. Preferably, the heat exchange medium 4 is water, heat transfer oil, and downterm.

Figure 2:
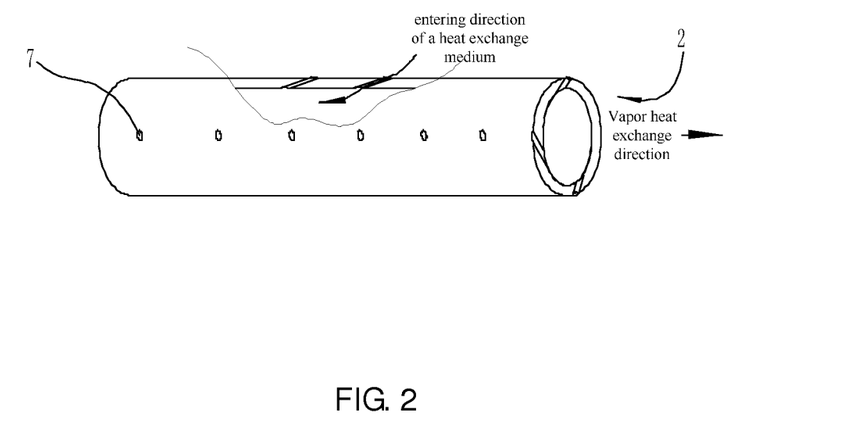
FIG. 2 is a schematic diagram of disposition of an inner metal tube capillary through-hole of a phase transformation heat exchange device according to an embodiment of the present invention.

FIG. 2 is a schematic diagram of disposition of an inner metal tube capillary through-hole of a phase transformation heat exchange device according to an embodiment of the present invention. It can be seen from the partial sectional portion that, preferably, the direction of the capillary through-hole 7 of the inner metal tube 2 and the direction of the radius of the cross section of the tube form an intersection angle, thus, it enlarges the flowing route of the heat exchange medium and forms rotation along the circumferential direction, improves the evenness of the temperatures on the circumference of the outer tube of the heat exchange device, improves the heat exchange effect, and avoids the pipe warping caused by uneven heating of the outer tube. Preferably, except for forming the intersection angle with the radius direction on the circumference, the direction of the capillary through-hole 7 of the inner metal tube forms a reverse angle with the direction of the vapor travelling along the pipe axial direction, so that after being ejected from the capillary through-holes 7, the liquid phase heat exchange medium fully collides with and touches the vapor, the liquid phase particles are further segmented and micronized, which reduces the impact of the two phases transformation of the liquid phase heat exchange medium. Other than that, the capillary through-hole 7 forming a reverse angle can also achieve the effects of making the vapor move spirally and wholly, enlarging the contact area with the high temperature wall, increasing heat exchange, homogenizing the temperature distribution in the circumferential direction of the wall, and reducing pipe warping. Further and preferably, the arrangement of the capillary through-holes 7 of the inner metal tube with changing intervals along the axial direction improves the unevenness of parameter distribution brought due to the output of the vapor from the pipe end, makes the heat absorption capability of each place along the axial direction relatively even, therefore, the wall temperatures are relatively consistent along the axial direction, the heat absorption capability is increased, heat loss is reduced, and locally superheating damage is avoided, thus the vapor heat exchange medium keeps a stable and safe parameter during movement. More preferably, the interval of the capillary through-holes 7 of the inner tube is relatively large at the side adjacent to the outlet end of the vapor, and the interval of the capillary through-holes 7 at the side far away from the outlet end is relatively small, according to the different location of receiving heat, unevenly arranged capillary through-holes 7 can obtain a relatively stable vapor heat exchange performance. Preferably, the liquid phase heat exchange medium is injected into the vaporization region from the liquid phase region using the pulse-type compression liquid ejection mode. The compression liquid ejection is performed to the inner and outer tube space in a certain time interval, and the liquid amount is controlled in this mode, thus lowering processing difficulty of the small diameter capillary through-holes 7.

In one embodiment, in order to improve the working efficiency of the phase transformation heat exchange device, preferably, the inner metal tube 2 is provided with very few orifices of the capillary through-holes at the direction of the vapor outlet, so as to reduce the injection amount of the vapor at this place, after passing through this place, the vapor is heated into superheated vapor, that is, the vapor has some superheat spaces at the direction of the vapor outlet, so that there is no injection of the liquid phase heat exchange medium at the outlet end of the vapor heat exchange medium, and the vapor is directly heated to finish further heating process.

The phase transformation heat exchange device of the embodiment of the present invention uses a heat exchange medium with phase transformation capacity within certain temperatures, for example the water, as a working medium, within the linear heating space (for example, a tube shape), the water is injected relatively evenly along the axial direction, so that the heat absorption phase transformation of the injected water mainly occurs on the path along the radial direction. An inner tube distribution water path is disposed along the axial direction of the heating pipe, the low temperature water of the inlet is ejected relatively evenly at each distribution location along the pipe axial direction, because the ejected water amount at each point is little, they all can be quickly vapored with similar speed; in this way, relatively even two-phase transformation can be obtained in the axial direction of the whole phase transformation heat exchange device, so as to overcome all kinds of problems brought by two phase flow transformation gradually happened during the axially flowing process, such as the water hammer of the water heat exchange medium, oscillation phenomena, and pipe exhaust damage, etc.; in addition, superheated vapor which is completely dried can also be obtained by controlling the vapor to output with higher temperature and lower pressure.

Figure 3:
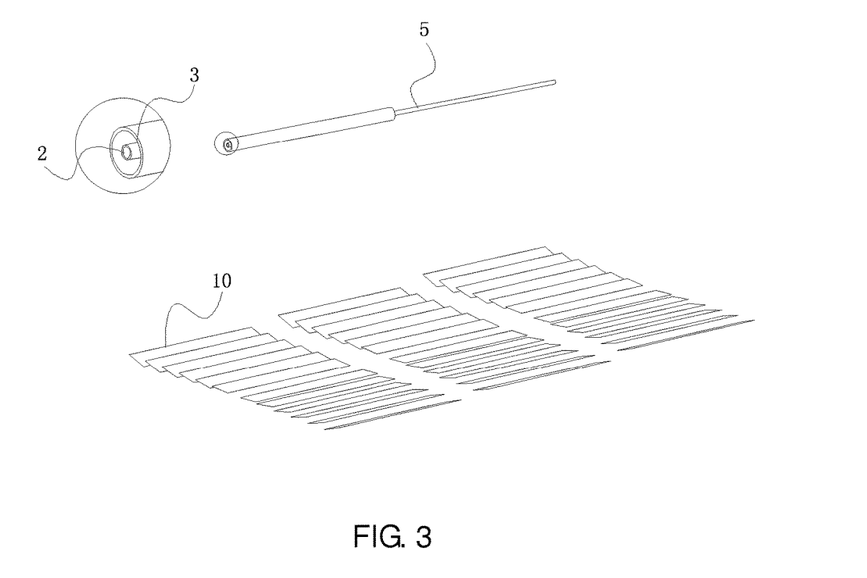
FIG. 3 is a schematic diagram of a whole structure of a phase transformation heat exchange device applied to the solar energy Fresnel array field according to a second embodiment of the present invention.

FIG. 3 is a schematic diagram of a whole structure of a phase transformation heat exchange device applied to the solar energy Fresnel array field according to a second embodiment of the present invention. As shown in FIG. 3, the first embodiment (the heat exchange medium is water) receives light reflected by the solar energy mirror field 10 of the solar energy Fresnel array, after the vapor output, because the obtained vapor parameters are not easy to be controlled, it is further disposed that, after the vapor heat exchange medium flows from the inner metal tube 2, it enters into the superheat region inside the fourth metal tube 5, in addition, the fourth metal tube 5 is disposed along the extended axis of the first embodiment; the wet vapor heat exchange medium is heated inside the superheat region of the fourth metal tube 5 and thereafter obtains the needed higher parameter, and outflows from the end; the vapor is basically of a single phase inside the superheat region, and there is no problems of water hammer, oscillation, and serious warping and so on due to phase transformation of the liquid phase heat exchange medium.

Figure 41:
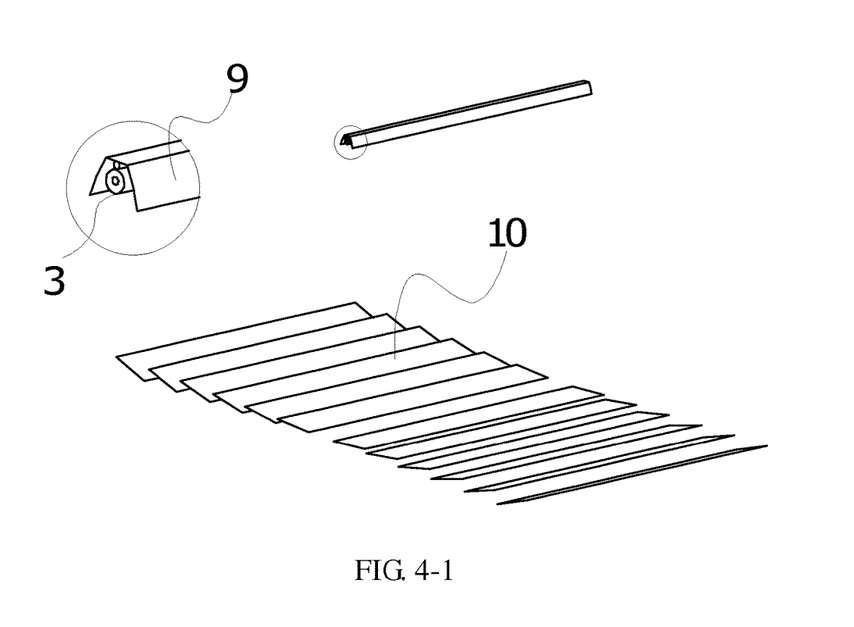

FIG. 4-1 is a schematic diagram of a whole structure of a phase transformation heat exchange device applied to the solar energy Fresnel array field according to a third embodiment of the present invention. Because, the vapor parameter obtained after the first embodiment (the heat exchange medium is water) finishes vapor output cannot be easily controlled, and even if the fourth metal tube is disposed at the extended line of the first embodiment according to the second embodiment of the present invention, situations of uneven heat received by the liquid phase region may also occur (for example, the phase transformation heat exchange device is applied to the solar energy Fresnel array field or the solar energy photothermal trench type field), the internal temperature difference of the fourth metal tube may also be relatively high, and warping may also appear; in the third embodiment of the invention, as shown in FIG. 4-1, the phase transformation heat exchange device receives the light reflected by the solar energy mirror field 10 of the solar energy Fresnel array, incident into the phase transformation heat exchange device under the re-focusing of the light of the compound parabolic concentrator (CPC) 9.

Figure 42:
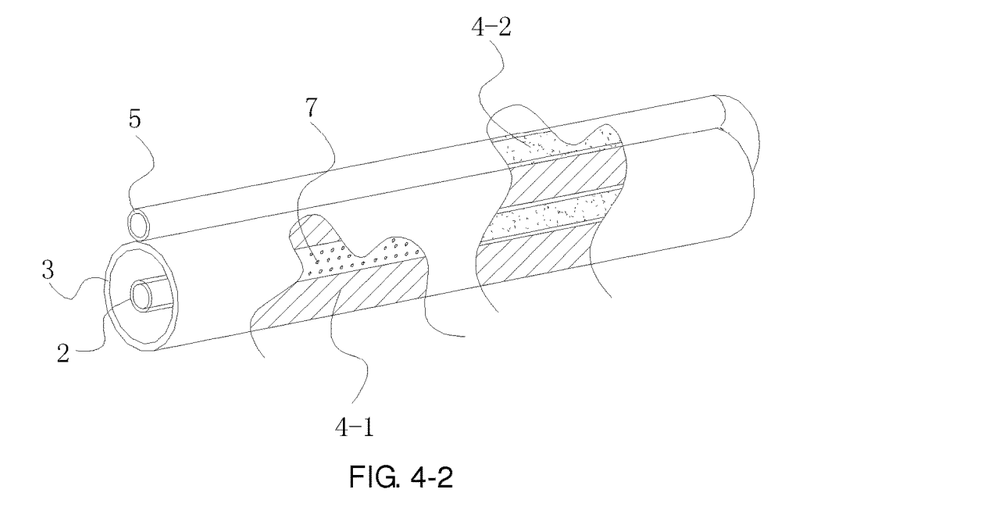

FIG. 4-2 is a schematic structural diagram of a phase transformation heat exchange device according to the third embodiment. According to FIG. 4-2, the superheat region of the fourth metal tube 5 is disposed at the top of the axis of the outer metal tube 3 in parallel, the two are disposed under the compound parabolic concentrator (CPC) (refers to FIG. 4-1 for specific location); the inner metal tube 2 and the outer metal tube 3 are concentrically disposed internally and externally, the capillary through-holes 7 are disposed on the wall of the inner metal tube 2 along the axial direction, the annular sectional space between the inner metal tube 2 and the outer metal tube 3 forms a whole or part of the liquid phase region, a liquid phase heat exchange medium 4-1 is inside; the interior of the inner metal tube 2 is a vaporization region, the interior of the fourth metal tube 5 is a superheat region, the interior of both is a vapor phase heat exchange medium 4-2; the fourth metal tube 5 is disposed on top of the outer metal tube 3, under the effect of the compound parabolic concentrator (CPC) 9, the proportions of the reflected light of the solar energy mirror field 10 obtained by the fourth metal tube 5 and the outer metal tube 3 are different.

Figure 43:
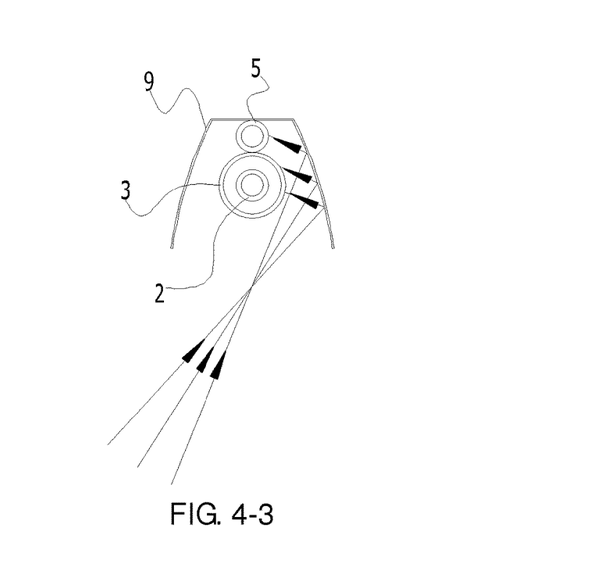

FIG. 4-3 is a schematic diagram of the heating phase transformation heat exchange device being heated according to the third embodiment. As shown in FIG. 4-3, the ratio of the heat of the solar energy mirror field received by the fourth metal tube 5 and the outer metal tube 3 is related to different pipe diameters and the inconsistency of solar rays at different times. The pipe diameter of the fourth metal tube 5 is designed to be less than that of the outer metal tube 3 in the phase transformation heat exchange device, in addition, it satisfies that the ratio of the heat of the solar energy mirror field received by the fourth metal tube 5 and the outer metal tube 3 at different times is approximately 1:2-5; for example, the outer metal tube 3 at the bottom receives 75% of the total heat, and the fourth metal tube 5 on the top receives 25% of the total heat, this proportion equals to the proportion of the vaporization heat and the superheated vapor heat of the water heat exchange medium, that is, the heat received by the bottom outer metal tube 3 basically satisfies that the internal liquid phase heat exchange medium is transformed to the saturated vapor heat exchange medium, then enters inside the fourth metal tube 5 to receive another part of the total heat, so that the saturated vapor heat exchange medium is further superheated, and then leaves the system after reaching the needed parameter, so as to finish the heat exchange.

The fourth metal tube 5 of the structure of this embodiment is disposed on top of the outer metal tube 3, the received heat density is relatively small, and the pipe diameter is relatively small, it is easier to finish the internal heat exchange, its wall temperature has a temperature difference which is more consistent, which further lowers the wall warping temperature; in addition, in the third embodiment, even there is a situation that a part within a certain length area along the axial direction of the phase transformation heat exchange device is not heated evenly or is not heated (for example, the situation that the cloud covers the solar ray incident mirror field), because the outer metal tube 3 and the fourth metal tube 5 are disposed in parallel, the proportion of receiving solar rays corresponding to the outer metal tube 3 and the fourth metal tube 5 is still equal, it can still handle the quality proportional relationship of the saturated heat exchange medium and the superheated heat exchange medium very well, avoid situations such as that, a conventional system causes the phase transformation process of the heat exchange medium hard to control due to certain part unevenly heated, thereby causing the operation of the system instable, etc. Further preferably, the fourth metal tube 5 and the outer metal tube 3 can be fixed with each other up and down by methods such as welding etc., even the pipe is warping, the stability of the structure of the system and the shape size will not be damaged.

Figure 44:
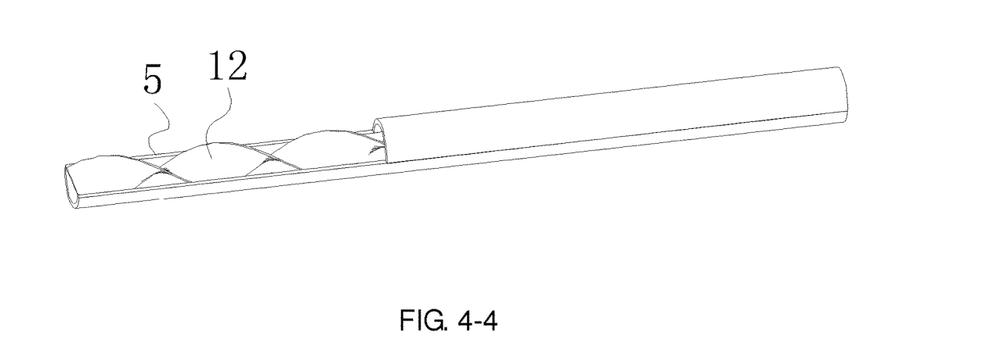

FIG. 4-4 is a schematic structural diagram of a fourth tube of the phase transformation heat exchange device according to the third embodiment; as shown in FIG. 4-4, in order to obtain the more even wall temperature difference, a spiral flow guiding device is disposed inside the fourth metal tube 5, for example, a spiral rotating fin 12; during the process of the vapor phase heat exchange medium flowing through the superheat region, under the function of the spiral rotating fin 12, the vapor phase heat exchange medium moves spirally, which lowers the temperature difference of the circumferential wall of the superheat region, and lowers the warping of the pipeline.

Figure 5:
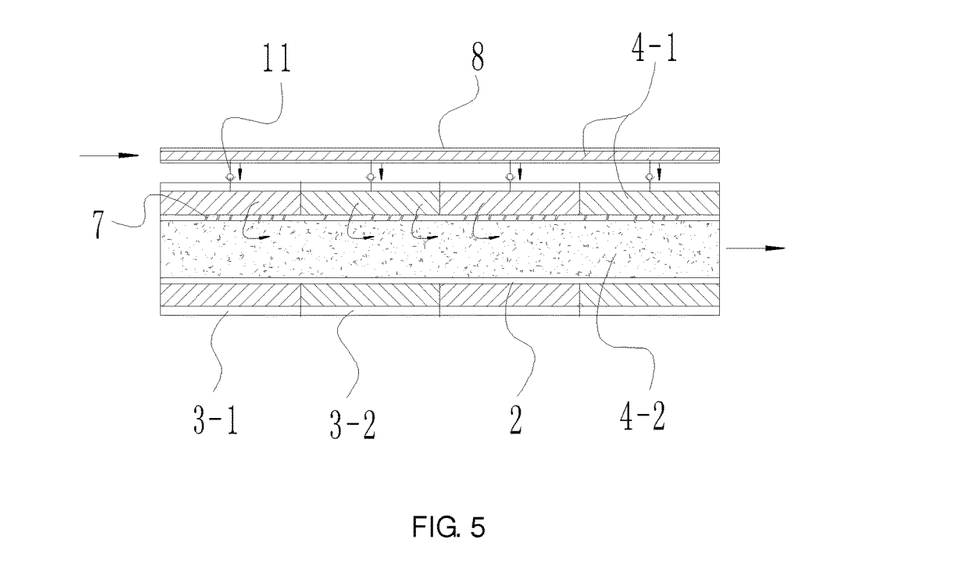
FIG. 5 is a schematic diagram of a whole structure of a phase transformation heat exchange device according to a fourth embodiment of the present invention.

FIG. 5 is a schematic diagram of a whole structure of a phase transformation heat exchange device according to a fourth embodiment of the present invention; as shown in FIG. 5, the outer metal tube 3 is sectionally disposed outside of the inner metal tube 2 in series, for example, each 8 m is an unit, and the water supply pipe 8 is disposed in parallel along the axial direction of the inner metal tube 2, each outer metal tube, such as 3-1 and 3-2, is independently connected to the water supply pipe 8 via the check valve 11, executes independent pressure control and heat exchange medium input control separately; when a certain part of the outer metal tube 3 is affected by outside (for example, cloud coverage), the surface of which is not heated, the corresponding water supply pipe does not execute water replenishment under the control of the check valve, which can control the heat balance of the whole system very well, and maintain the heat stability of the system; the liquid phase heat exchange medium 4-1 controls the corresponding outer metal tube respectively through each check valve 11 from the water supply pipe 8, for example, the outer metal tube 3-1 or the outer metal tube 3-2; each outer metal tube enters the inner metal tube through the capillary through-holes 7 on the wall of the inner metal tube 2 according to the parameter change of the internal heat exchange medium, after being vapored into the vapor phase heat exchange medium 4-2, it flows out of the system from another end of the inner metal tube. Preferably, the liquid phase heat exchange medium uses pulse-type fluid to inject into the liquid region, so as to more efficiently supply the liquid phase heat exchange medium. It overcomes a series of problems caused by locally uneven heating on the total length of the phase transformation heat exchange device when the phase transformation heat exchange device of the first embodiment is applied to the solar energy linear photothermal field, and only a single check valve (for example the length of which is 300 m) is disposed at the total end of the heat exchange device; for example, the liquid phase heat exchange medium ejected inside the inner metal tube 2 cannot in time transform to vapor, there is much water at the bottom, then after the cloud position has changed, the liquid phase heat exchange mediums all vaporize, which causes heat stability problems such as vibration.

Figure 6:
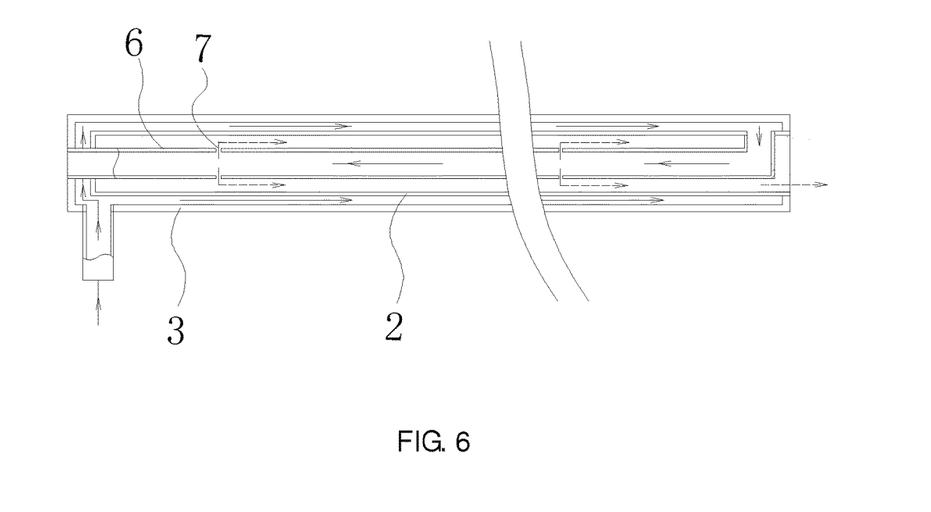
FIG. 6 is a schematic diagram of a whole structure of a phase transformation heat exchange device according to a fifth embodiment of the present invention.

FIG. 6 is a schematic diagram of a whole structure of a phase transformation heat exchange device according to a fifth embodiment of the present invention; in order to obtain better even temperature performance of the pipe annular wall, further, the liquid phase heat exchange medium within the liquid phase region formed by the inner metal tube 2 and the outer metal tube 3 is set to circulate wholly inside the circulating pipe disposed inside the system; as shown in FIG. 6 (the flowing direction of the solid line represents the flowing direction of the liquid phase heat exchange medium, the direction of the dash line represents the flowing direction of the vapor phase heat exchange medium), the liquid phase region includes a third metal tube 6 disposed inside the inner metal tube 2, where the third metal tube 6 is connected to the liquid phase region formed by the inner metal tube 2 and the outer metal tube 3, and the capillary through-holes 7 are disposed along the axis direction of the inner metal tube 2, where the capillary through-holes 7 of the heat exchange medium are disposed on the wall of the third metal tube 6, the liquid phase heat exchange medium flows in the liquid phase region formed by the inner metal tube 2 and the outer metal tube 3, and it flows into the third metal tube 6, and enters the vaporization region through the capillary through-holes 7 on the wall of the third metal tube 6. Because the area of the solar energy mirror field can be set relatively large, the flow rate of the liquid phase heat exchange medium in the liquid phase region is not slow, therefore, the flow of the liquid phase heat exchange medium in the liquid phase region can be completed without the drive of an extra circulating pump, and the pipe wall temperature can also obtain good even temperature performance; preferably, a spiral flow guiding device is disposed on the inner wall of the annular space formed by the inner metal tube 2 and the third metal tube 6 along the axial direction of the inner metal tube 2, for example, a spiral rotating fin, which can cause the vapor heat exchange medium moving inside to generate a vortex, and increase the heat exchange capability; preferably, a plurality of blocking slices are disposed vertically on the wall surface of the spiral flow guiding device, first, it increases the wall even temperature performance on the circumference of the phase transformation heat exchange pipe, second, it increases the convection along the radius direction of the liquid phase heat exchange medium, and increases the even temperature performance of the liquid phase heat exchange medium itself, lowers the heat conduction connective thermal resistance of the liquid phase heat exchange medium between the outer metal tube 3 and the inner metal tube 2, lowers the temperature difference between the two, and provides enough heat exchange temperature difference for the vaporization region.

Figure 7:
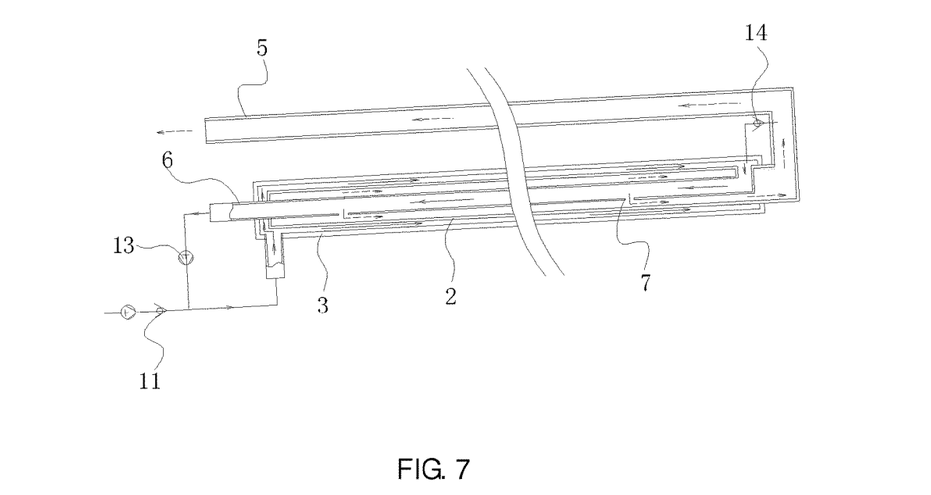
FIG. 7 is a schematic diagram of a whole structure of a phase transformation heat exchange device according to a sixth embodiment of the present invention.

FIG. 7 is a schematic diagram of a whole structure of a phase transformation heat exchange device according to a sixth embodiment of the present invention; as shown in FIG. 7 (the flowing direction of the solid line represents the flowing direction of the liquid phase heat exchange medium, the flowing direction of the dash line represents the flowing direction of the vapor phase heat exchange medium), internal circulation of the liquid phase heat exchange medium is executed inside the liquid phase region, a circulating pump 13 is disposed at the end of the liquid phase region; under the function of the circulating pump 13 at the output end of the third metal tube 6, the liquid phase heat exchange medium flows circularly inside the circulating passage composed of the annular sectional space formed by the inner metal tube 2 and the outer metal tube 6, and the internal space of the third metal tube 6, so that the temperature of the liquid phase heat exchange medium is basically the same, which achieves a good effect of consistent temperature of the heat exchange tube wall, and, it very well overcomes the instability of the system caused by the part or whole phase transformation heat exchange device being not heated abruptly or being fiercely heated abruptly. During the actual operation, a part of vapor may be generated inside the liquid phase region as the liquid phase region being fiercely heated abruptly, the part of vapor occupies the capillary through-holes 7, and enters the vaporization region through the capillary through-holes 7, thus, the heat absorbed by the liquid phase heat exchange medium entering the vaporization region is reduced, so that the heat inside the system cannot be brought out of the system through the vaporization of the liquid phase heat exchange medium, further, it causes more liquid phase heat exchange medium inside the liquid phase region to boil and become vapor, which causes the output failure of the pipe system, and more severely, the pipe damage; preferably, the liquid phase region has an exhaust region storing and exhausting vapor generated in the liquid phase region; preferably, the exhaust region is located at the input end of the liquid phase heat exchange medium of the liquid phase region, the exhaust region is obtained by making the liquid phase region incline at a small angle as a whole, for example, forming an angle of 2° with the horizontal plane, or by gradually increasing the diameter along the moving direction of the liquid phase heat exchange medium; further, an exhaust valve 14 is disposed at a particular location of the exhaust region, and the exhaust valve 14 exhausts the vapor phase heat exchange medium generated due to instable heating of the liquid phase region out of the liquid phase region; preferably, the outlet of the exhaust valve 14 is connected to the superheat region, further superheating is completed inside the fourth metal tube 5, or the outlet of the exhaust valve 14 is connected to the vaporization region, and then to the superheat region. In order to further reduce the vapor which is generated inside the liquid phase region, occupies the capillary through-holes 7, and then enters the vaporization region, preferably, the exhaust valve 14 is disposed at the exhaust region of the third metal tube 6, it is most preferably disposed at the back of the third metal tube 6 (the surface opposite to the gravity direction), which is convenient for the vapor phase inside the liquid phase region entering the vaporization region, avoids the superheat phenomenon of the pipe wall caused as the supplement amount of the flow entering the vaporization region reducing.

The liquid phase heat exchange medium flows circularly in the liquid phase region, and the wall even temperature effect during the system operation process can be obtained; the wall even temperature effect can also be obtained by the following modes: 1. The circulating pipe disposed inside the liquid phase region is an annular spiral pipe, including water inlet and outlet pipes formed by two parallel spiral pipes, and the two are disposed alternatively, the liquid phase flows through the high temperature region and the low temperature region of the annular wall back and forth, which increases the heat exchange performance inside the liquid phase heat exchange medium, and makes the inner tube and the outer tube form independent basically even temperature wall surfaces; 2. In order to obtain good parameters of the liquid phase heat exchange medium and the vapor phase heat exchange medium inside the liquid phase region and the vaporization region, the inner metal tube 2 and the third metal tube 6 can be set as a spiral corrugated tube or a spiral corrugated segmented tube.

A specific embodiment applying to the solar energy Fresnel array is: the phase transformation heat exchange device includes an outer metal tube, an inner metal tube, a third metal tube located inside the inner metal tube; a fourth metal tube disposed on top of the outer metal tube in parallel; under the effect of the compound parabolic concentrator, the ratio of the heat received by the fourth metal tube and the outer metal tube is 1:3; assume that the total length of the mirror field is 300 m, the diameter of the open mouth is 6 m, the DNI is 900 W/m2, the receiving efficiency of the phase transformation heat exchange system is 0.54, the total receiving power is 972 KW, the size of the outer metal tube is 64 mm×3 mm; the inner metal tube is 48 mm×1.2 mm (pressure bearing is relatively small), the third metal tube is 38 mm×1.2 mm (pressure bearing is relatively small), the fourth tube is 38 mm×2.5 mm, the liquid phase heat exchange medium water is input to the system by 5 MPa, 220° C., and high pressure vapor with parameter 435 is output; the total flow rate of the system is 0.41 kg/s, and the maximum flow rate of entering the liquid phase region formed by the outer metal tube and the inner metal tube is 0.59 m/s, the flow rate of the liquid phase heat exchange medium water inside the third tube is 0.49 m/s, and the maximum speed of the vapor of the vaporization region is 41.2 m/s.

Undoubtedly, the phase transformation heat exchange device can also be applied to the tower system of the solar energy photothermal field, an array of the phase transformation heat exchange device is disposed on the tower photothermal central receiving tower, and receives the solar ray concentrated by the mirror field, the superheated vapor after the vaporization phase transformation inside the phase transformation heat exchange medium carries the solar photothermal away from the heat collecting system; the phase transformation heat exchange medium can also be applied to the input and output field of the heat storage system, where the heat storage medium liquid phase region heats the heat exchange medium, and the heat inside the heat storage system is transformed into the vapor phase heat exchange medium through the phase transformation of the heat exchange medium and then leaves the heat storage system.

The phase transformation heat exchange medium of the invention can also be applied to the boiler heating filed. Where, the outer metal tube 3 is a heating surface heating the liquid phase heat exchange medium flowed from the inner metal tube 2 or the fourth metal tube 5 to vapor state, so as to complete the heat energy swapping; except for no need of absorption coating and optical structure, other specific structure details are the same as the above description. The application also has the advantages of the above phase transformation heat exchange device. In addition, it needs to be noted that, the tube structure of the device of the invention is preferably metal material, but is not limited to the metal material; the structural shapes of the liquid phase region, the vaporization region, and the superheat region are preferably of tube shapes, but are not limited to the tube shapes.

It is obvious that the invention described above can have many variations in the premise of not departing from the spirit and scope of the present invention. Therefore, all the modifications predictable to the persons skilled in the art should fall within the scope of the present claims. The protection of the invention is limited by the claims.

What is claimed is:

1. A phase transformation heat exchange device, comprising an inner tube, a metal outer tube and a heat exchange medium; wherein an annular space between the inner tube and the outer tube forms a whole or a part of a liquid phase region; a whole or a part of space inside the inner tube forms a vaporization region; the heat exchange medium with a first pressure inside the liquid phase region enters the vaporization region with a second pressure while being heated when flowing, and flows out of the phase transformation heat exchange device after being vaporized, wherein the first pressure is higher than the second pressure;
   wherein the liquid phase region is disposed in independent sections along an axial direction of the inner tube in a serial manner, and a check valve is disposed at an inlet of the liquid phase heat exchange medium of each of the independent sections, for executing independent pressure control and heat exchange medium input control separately;
   wherein the each section is connected to a water supply pipe via the corresponding check valve, wherein the water supply pipe is disposed outside the outer tube and in parallel along the axial direction of the inner tube.

2. The phase transformation heat exchange device according to claim 1, wherein a contact wall between the liquid phase region and the vaporization region is provided with one or more medium passages.

3. The phase transformation heat exchange device according to claim 2, wherein each of the medium passages is a capillary through-hole, a capillary, a nozzle or a permeable material port.

4. The phase transformation heat exchange device according to claim 2, wherein the medium passages are disposed spaced on an inner surface of the contact wall along an axial direction.

5. The phase transformation heat exchange device according to claim 2, wherein each of the medium passages is configured for the heat exchange medium being injected from the liquid phase region into the vaporization region by using a pulse-type compression liquid ejection method.

6. A phase transformation heat exchange device, comprising an inner tube having a plurality of directional medium passages formed on a sidewall thereof, a metal outer tube and a heat exchange medium;
   wherein an annular space between the inner tube and the metal outer tube forms a liquid phase region, a space inside the inner tube forms a vaporization region, and the liquid phase region and the vaporization region are in fluid communication via the directional medium passages;

wherein the heat exchange medium inside the liquid phase region enters the vaporization region via the directional medium passages while being heated when flowing, and flows out of the phase transformation heat exchange device after being vaporized;

wherein the liquid phase region is disposed in independent sections along an axial direction of the inner tube in a serial manner, and a check valve is disposed at an inlet of the liquid phase heat exchange medium of each of the independent sections, for executing independent pressure control and heat exchange medium input control separately;

wherein the each section is connected to a water supply pipe via the corresponding check valve, wherein the water supply pipe is disposed outside the outer tube and in parallel along the axial direction of the inner tube.

7. The phase transformation heat exchange device according to claim 6, wherein each of the directional medium passages is a capillary through-hole, a capillary, a nozzle or a permeable material port.

* * * * *